(12) United States Patent
Takada et al.

(10) Patent No.: US 9,859,569 B2
(45) Date of Patent: Jan. 2, 2018

(54) METHOD AND DEVICE FOR MANUFACTURING FILM-WRAPPED ELECTRICAL DEVICE

(71) Applicants: NISSAN MOTOR CO., LTD., Yokohama-shi, Kanagawa (JP); AUTOMOTIVE ENERGY SUPPLY CORPORATION, Zama-shi, Kanagawa (JP)

(72) Inventors: Koichi Takada, Atsugi (JP); Yuta Motohashi, Sagamihara (JP)

(73) Assignees: NISSAN MOTOR CO., LTD., Yokohama-shi (JP); AUTOMOTIVE ENERGY SUPPLY CORPORATION, Zama-shi (JP)

( * ) Notice: Subject to any disclaimer, the term of this patent is extended or adjusted under 35 U.S.C. 154(b) by 406 days.

(21) Appl. No.: 14/376,774

(22) PCT Filed: Feb. 7, 2013

(86) PCT No.: PCT/JP2013/052807
§ 371 (c)(1),
(2) Date: Aug. 5, 2014

(87) PCT Pub. No.: WO2013/118804
PCT Pub. Date: Aug. 15, 2013

(65) Prior Publication Data
US 2014/0373344 A1 Dec. 25, 2014

(30) Foreign Application Priority Data
Feb. 7, 2012 (JP) ................. 2012-024426

(51) Int. Cl.
| | | |
|---|---|---|
| *H01M 6/04* | (2006.01) |
| *H01M 2/02* | (2006.01) |
| *H01M 2/36* | (2006.01) |
| *H01G 9/00* | (2006.01) |
| *H01G 13/04* | (2006.01) |
| *H01G 9/08* | (2006.01) |
| *H01G 11/78* | (2013.01) |
| *H01G 11/84* | (2013.01) |

(52) U.S. Cl.
CPC ............ *H01M 6/04* (2013.01); *H01G 9/0029* (2013.01); *H01G 9/08* (2013.01); *H01G 11/78* (2013.01);
(Continued)

(58) Field of Classification Search
None
See application file for complete search history.

(56) References Cited

U.S. PATENT DOCUMENTS

| 6,371,996 B1 | 4/2002 | Takayama et al. |
| 8,343,240 B2 | 1/2013 | Shimura et al. |

(Continued)

FOREIGN PATENT DOCUMENTS

| EP | 1 061 601 A1 | 12/2000 |
| EP | 1 396 037 A2 | 3/2004 |

(Continued)

*Primary Examiner* — Rena D Cronin
(74) *Attorney, Agent, or Firm* — Foley & Lardner LLP

(57) ABSTRACT

Provided is a method for manufacturing a film-wrapped electrical device, including: a first injection step of depressurizing, to a given pressure lower than atmospheric pressure, the inside of an injection chamber (2) in which a bag-shaped laminate film wrapping member (29) is placed, the laminate film wrapping member (29) having an opening portion (29a) and housing an electrode assembly (21') including a positive electrode and a negative electrode stacked with a separator therebetween, and injecting part of a predetermined injection amount of an electrolyte solution (20) into the wrapping member (29) through the opening portion (29a); and a second injection step of, after the first injection step, pressurizing the inside of the injection chamber (2) to a pressure higher than the given pressure and injecting the rest of the predetermined injection amount of the electrolyte solution (20).

3 Claims, 7 Drawing Sheets

(52) U.S. Cl.
CPC ............ *H01G 11/84* (2013.01); *H01G 13/04* (2013.01); *H01M 2/0267* (2013.01); *H01M 2/0277* (2013.01); *H01M 2/0287* (2013.01); *H01M 2/361* (2013.01); *H01M 2/365* (2013.01); *H01M 2/021* (2013.01); *Y02E 60/13* (2013.01); *Y10T 29/49115* (2015.01); *Y10T 29/53278* (2015.01)

(56) References Cited

U.S. PATENT DOCUMENTS

| | | | | |
|---|---|---|---|---|
| 2006/0166093 | A1* | 7/2006 | Zaghib | ........... H01G 11/42 |
| | | | | 429/217 |
| 2007/0072086 | A1* | 3/2007 | Nakagawa | ........... H01M 4/525 |
| | | | | 429/330 |
| 2009/0242073 | A1* | 10/2009 | Reschke | ............... H01M 2/361 |
| | | | | 141/7 |
| 2011/0005050 | A1 | 1/2011 | Shimura et al. | |
| 2013/0029186 | A1 | 1/2013 | Takada | |
| 2013/0061461 | A1 | 3/2013 | Shimura et al. | |

FOREIGN PATENT DOCUMENTS

| | | | |
|---|---|---|---|
| JP | 02-079364 A | 3/1990 | |
| JP | 05-325945 A | 12/1993 | |
| JP | 2000-311661 A | 11/2000 | |
| JP | 2001-196050 * | 7/2001 | ............. H01M 2/36 |
| JP | 2002-151052 A | 5/2002 | |
| JP | 3467135 B2 | 11/2003 | |
| JP | 2009-181862 A | 8/2009 | |
| JP | 2011-222221 * | 11/2011 | ............. H01M 2/36 |
| JP | 2011-222221 A | 11/2011 | |
| WO | WO 2009/096602 A1 | 8/2009 | |

* cited by examiner (a)

(b)

METHOD AND DEVICE FOR MANUFACTURING FILM-WRAPPED ELECTRICAL DEVICE

TECHNICAL FIELD

The present invention relates to a method and a device for manufacturing a film-wrapped electrical device in which an electrical device element such typically as a battery or a capacitor is housed inside a laminate film.

BACKGROUND ART

Electrical devices such typically as electrolytic capacitors and batteries are each manufactured by injecting electrolyte solution into a case of a metal or the like with an electrode assembly housed therein to obtain an electrical device element, and then by closing the case. Note that in the explanation in this description, an "electrode assembly" is referred to as one including positive electrodes and negative electrodes stacked with separators therebetween and being in a state (stage) before a series of electrolyte solution injection steps are completed, while an "electrical device element" is referred to as one being in a state (stage) after the series of electrolyte solution injection steps are completed, so as to distinguish them from each other.

In conventional practices, a predetermined amount of electrolyte solution is injected into a case standing upright, and then kept standing still for a long period of time to let the electrolyte solution gradually permeate gaps in an electrode assembly. However, since the electrode assembly is usually obtained by tightly stacking electrode plates, it takes time to impregnate the gaps in the electrode assembly with the electrolyte solution. For the standing electrolyte solution to naturally permeate the gaps between the electrodes, it is necessary to leave them, for example, a whole day and night, and therefore the production efficiency is extremely poor.

Moreover, since the rate of impregnation with the electrolyte solution is extremely low, the electrolyte solution may overflow out of the case if the necessary amount of the electrolyte solution is all supplied at once into the case. For this reason, a method has been employed which involves, for example, liquid-tightly attaching a cover to an opening portion of the case and injecting a predetermined amount of the electrolyte solution into the cover. However, this method requires time and effort for the attachment of the cover to each individual case, which makes it difficult to enhance the manufacturing efficiency.

Patent Literature 1 discloses a method for injection and impregnation with electrolyte solution for solving such a problem. Specifically, a case is depressurized with its opening portion closed air-tightly, and electrolyte solution is injected into the depressurized case to impregnate gaps in an electrode assembly with the electrolyte solution. Instead of performing depressurization after injecting the electrolyte solution, the electrolyte solution is injected after depressurizing the opening portion of the case, so that a liquid pool is formed temporarily. After injecting the electrolyte solution into the depressurized case and letting the electrolyte solution permeate the gaps in the electrode assembly, the method raises the pressure inside the case to let the electrolyte solution in the liquid pool further permeate the gaps in the electrode assembly.

In this method, a depressurized state is temporarily made to remove air in the gaps in the electrode assembly that would otherwise impair the impregnation with the electrolyte solution, to establish a state where the electrolyte solution can easily permeate the gaps, and then the electrolyte solution is injected. Thereafter, the inside is also pressurized to inject the electrolyte solution in the liquid pool. Such a combination of depressurization and pressurization not only shortens the time required for the impregnation with the electrolyte solution but also prevents the electrolyte solution from spattering when the pressurization is released.

Meanwhile, besides electrical devices using metal cases as described above, film-wrapped electrical devices have been developed each of which uses, as its wrapping body, a laminate film wrapping member formed of a thin film obtained by laminating a metal layer of aluminum or the like and a thermal adhesive resin layer with an adhesive layer therebetween. In general, laminate film wrapping members have a structure in which both surfaces of a thin metal layer of aluminum or the like is coated with thin resin layers, and have acid- and alkali-resistant, light-weight, and flexible properties.

CITATION LIST

Patent Literature

Patent Literature 1: Japanese Patent No. 3467135

SUMMARY OF INVENTION

Technical Problems

The laminate film wrapping members of film-wrapped electrical devices have flexibility unlike the metal cases. In other words, the laminate film wrapping members are easily deformed, and this leads to problems that never occur to the metal cases which are not easily deformed even during the injection of the electrolyte solution.

First, the electrolyte solution injected in an opening portion of a bag-shaped laminate film wrapping member flows into spaces between the main surfaces of an electrode assembly and the laminate film without forming a liquid pool at the opening portion. For this reason, it is impossible to employ the method disclosed in Patent Literature 1, as it is, which involves temporarily sealing off the electrode assembly from the outside with the liquid pool and providing a pressure difference between the electrode assembly and the outside to impregnate the electrode assembly with the electrolyte solution forming the liquid pool. Hence, in the case of a film-wrapped electrical device using a laminate film wrapping member, it takes time to impregnate the gaps in the electrode assembly with the electrolyte solution as mentioned above. For the standing electrolyte solution to naturally permeate the gaps between the electrodes, it is necessary to leave them, for example, a whole day and night, and therefore the production efficiency is extremely poor.

Moreover, there is a problem in that the electrode assembly is not impregnated with the electrolyte solution at an even rate, but a phenomenon is likely to occur in which some portion to be impregnated, particularly a center portion of the electrode assembly cannot get sufficiently impregnated with the electrolyte solution (uneven impregnation). This uneven impregnation with the electrolyte solution may possibly appear as wrinkles on the surface of the laminate film due to the flexibility of the laminate film.

Furthermore, uneven impregnation of the electrode assembly with the electrolyte solution forms regions with low ionic conductivity between positive and negative electrodes in some part of their surfaces. This results in a problem of deteriorating the electrical characteristics of the battery.

In view of this, an object of the present invention is to provide a method and a device for manufacturing a film-wrapped electrical device with which an electrode assembly is less likely to be unevenly impregnated with electrolyte solution, and the electrolyte solution can be injected within a short period of time.

Solution to Problems

To achieve the above object, a method for manufacturing a film-wrapped electrical device of the present invention includes the following steps (1) to (3).

(1) Depressurizing, to a given pressure lower than atmospheric pressure, the inside of an injection chamber in which a bag-shaped laminate film wrapping member is placed, the laminate film wrapping member having an opening portion and housing an electrode assembly including a positive electrode and a negative electrode stacked with a separator therebetween.

(2) Including a first injection step of injecting part of a predetermined injection amount of an electrolyte solution into the wrapping member through the opening portion.

(3) Including a second injection step of, after the first injection step, pressurizing the inside of the injection chamber to a pressure higher than the given pressure and injecting the rest of the predetermined injection amount of the electrolyte solution.

Moreover, to achieve the above object, a device for manufacturing a film-wrapped electrical device of the present invention includes the following elements (1) to (3).

(1) Including a pressure adjuster device configured to adjust the pressure inside an injection chamber in which a bag-shaped laminate film wrapping member is placed, the laminate film wrapping member having an opening portion and housing an electrode assembly including a positive electrode and a negative electrode stacked with a separator therebetween.

(2) Including an injector device configured to inject an electrolyte solution into the wrapping member through the opening portion.

(3) Including a controller configured to cause the pressure adjuster device to depressurize the inside of the injection chamber to a pressure lower than atmospheric pressure and cause the injector device to inject part of a predetermined injection amount of the electrolyte solution into the wrapping member, and further including a controller configured to cause the pressure adjuster device to pressurize the inside of the injection chamber to a pressure higher than the pressure after the depressurization, and cause the injector device to inject the rest of the predetermined injection amount of the electrolyte solution into the wrapping member.

DESCRIPTION OF EMBODIMENT

Figure 1:
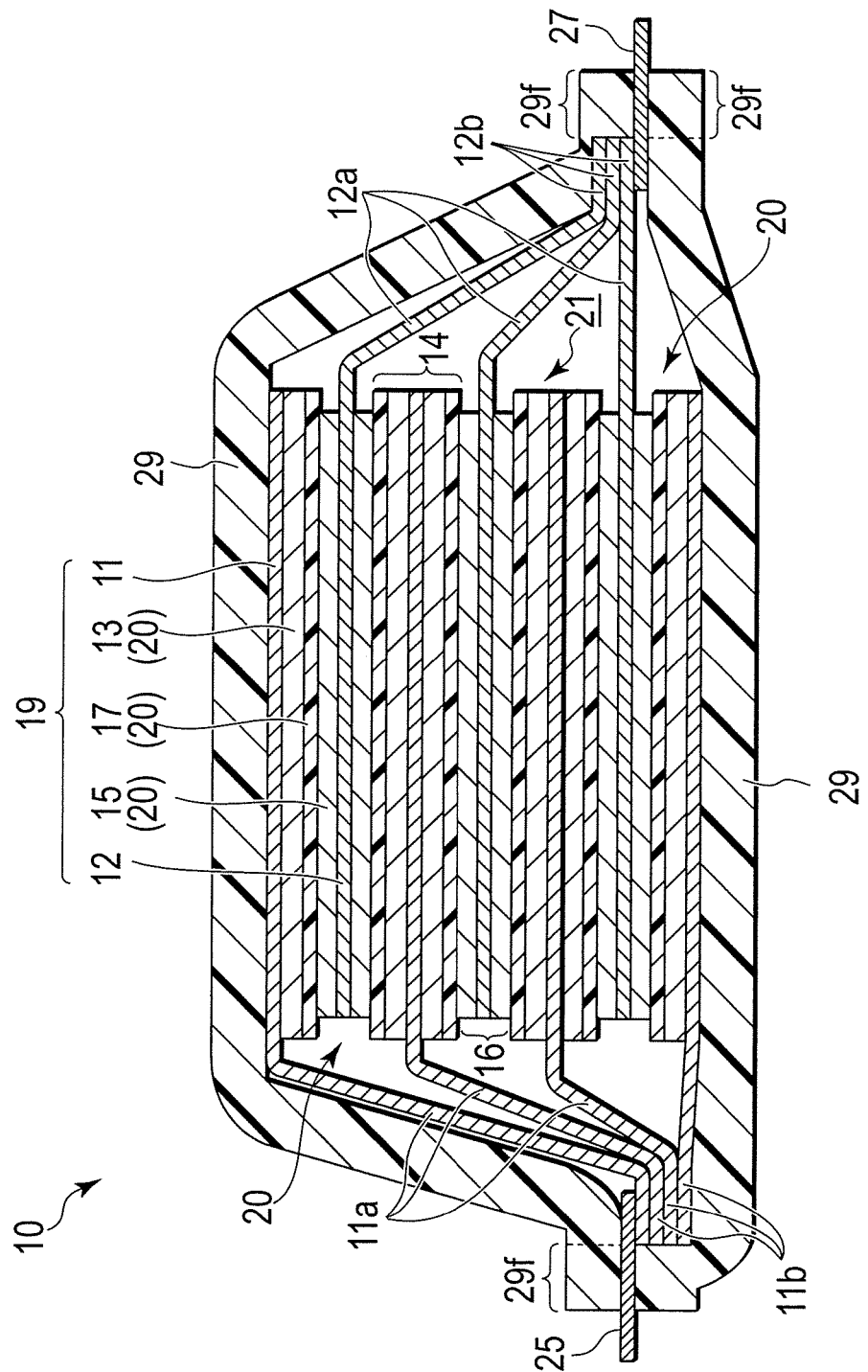
FIG. 1 is a cross-sectional view schematically showing the structure of a film-wrapped battery according to a first embodiment of the present invention.

Hereinbelow, an embodiment of the present invention will be described with reference to the drawings. Note that in the illustration of the drawings, the same elements will be denoted by the same reference signs, and overlapping description will be omitted. Moreover, the dimensional proportions in the drawings may be exaggerated for the sake of explanation and differ from the actual proportions.

Figure 2A:
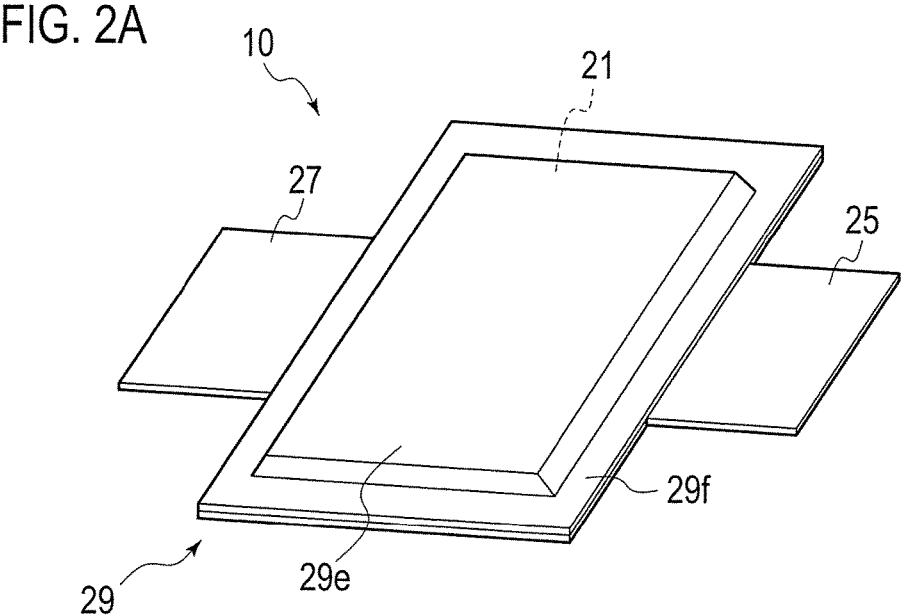
FIG. 2A is a perspective view schematically showing the film-wrapped battery in a completed state according to the first embodiment.
Figure 2B:
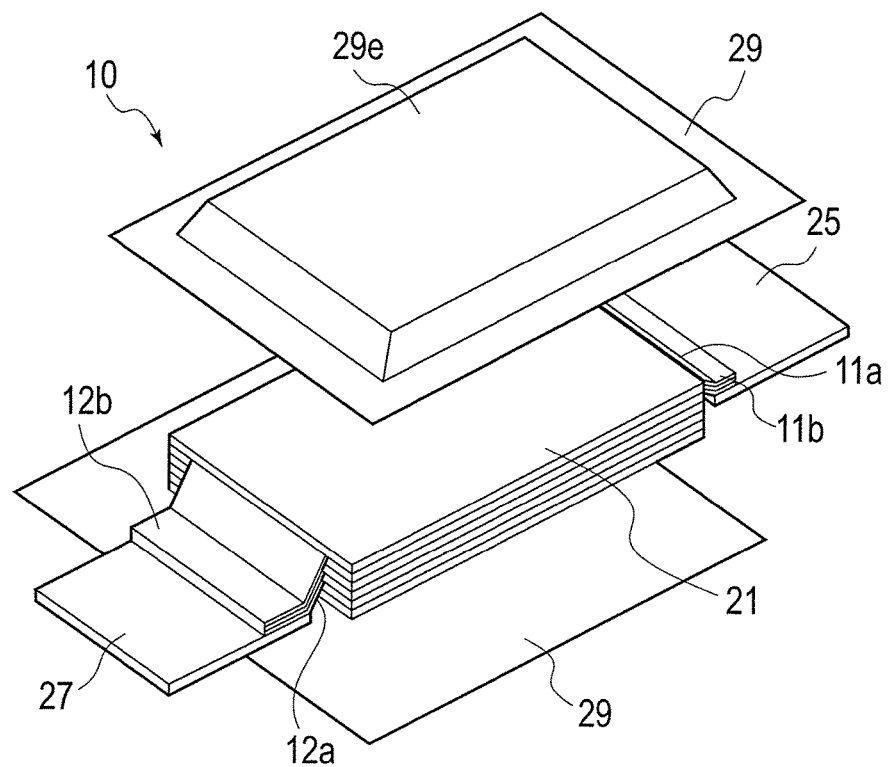
FIG. 2B is an exploded perspective view schematically showing the film-wrapped battery in FIG. 2A in a state of being broken down to constituent elements.

FIG. 1 is a cross-sectional view schematically showing the structure of a film-wrapped battery 10 of a first embodiment. FIG. 2 shows perspective views schematically showing the film-wrapped battery of the first embodiment. FIG. 2A is a perspective view of the film-wrapped battery in a completed state, and FIG. 2B is an exploded perspective view schematically showing the film-wrapped battery of the first embodiment in FIG. 2A in a state of being broken down to constituent elements.

<Film-Wrapped Battery>

First, the structure of the film-wrapped battery 10 (an example of a film-wrapped electrical device) of the first embodiment will be briefly described.

As shown in FIG. 1, the film-wrapped battery 10 of this embodiment has a structure in which a substantially rectangular power generating element 21 where actual electric charge and discharge take place is enclosed inside a bag-shaped laminate film which is a wrapping member 29. Specifically, the film-wrapped battery 10 includes the power generating element 21 and the wrapping member 29 formed of a bag-shaped laminate film housing the power generating element 21 and positive-electrode current collecting portions 12b and negative-electrode current collecting portions 11b provided thereto. The film-wrapped battery 10 further includes a positive-electrode tab 27 connected to the positive-electrode current collecting portions 12b and a negative-electrode tab 25 connected to the negative-electrode current collecting portions 11b.

Here, in this embodiment, an "electrode assembly" will be referred to as one including positive electrode plates (positive electrodes) 16 and negative electrode plates (negative electrodes) 14 stacked with separators therebetween and being in a state (stage) before a series of steps of injecting electrolyte solution 20 are completed, while a "power generating element" will be referred to as one being in a state (stage) after the series of steps of injecting the electrolyte solution 20 are completed, so as to distinguish them from each other. The electrolyte solution 20 is mainly used for electrolyte layers 17 serving as components of the power generating element 21. Specifically, the electrolyte layers 17 can be formed by impregnating the separators with the electrolyte solution 20. Note that the separators do not necessarily need to be impregnated with the entire amount of the electrolyte solution 20. It is desirable to impregnate electrode active material layers 13 and 15 with the electrolyte solution 20 as well. Further, the electrolyte solution 20 may be present in a gap (air cavity portion) between the power generating element 21 and the wrapping member 29.

As shown in FIGS. 2A and 2B, extending portions 11a and 12a of the electrode current collecting portions 11b and 12b each formed of a metal plate (or a metal foil) extend therefrom so that electric current can be taken out through (current collectors 11 and 12 of) the electrodes in each layer of the power generating element 21. The extending portions 11a and 12a of (the current collectors 11 and 12 of) the electrodes in each layer are connected to the negative-electrode tab 25 and the positive-electrode tab 27 at the corresponding negative-electrode current collecting portion 11b and positive-electrode current collecting portion 12b, respectively. Specifically, one ends of the extending portions 11a and 12a are connected to the negative-electrode current collector 11 and the positive-electrode current collector 12, respectively, and the current collecting portions 11b and 12b are disposed at or connected to the other ends of the extending portions 11a and 12a, respectively. Moreover, the negative-electrode tab 25 and the positive-electrode tab 27 have such a structure that they are sandwiched between end portions (closing portions or seal portions 29f) of the wrapping member 29 formed of a bag-shaped laminate film, and led out to the outside of the wrapping member 29. It is desirable to use ultrasonic welding, resistance welding, or the like to attach and connect the negative-electrode tab 25, the positive-electrode tab 27, the extending portions 11a and 12a of the electrode current collecting portions 11b and 12b, and the negative-electrode current collector 11 and the positive-electrode current collector 12 of each electrode.

FIGS. 2A and 2B show types in each of which a recessed portion 29e for housing the power generating element 21 is formed in the wrapping member 29 formed of a bag-shaped laminate film, and two laminate films as the wrapping member 29 are set to face each other to close the four sides. However, this embodiment is not limited to this type and may be applied to a type in which a flat laminate film with no recessed portion formed therein is used as the wrapping member 29, or a single laminate film is folded to close three sides. Alternatively, this embodiment may be applied to, for example, a type in which two flat laminate films with no recessed portion formed therein are used as the wrapping member 29, or two laminate films are laid over one another to close the four sides. Thus, this embodiment is not particularly limited.

Figure 3:
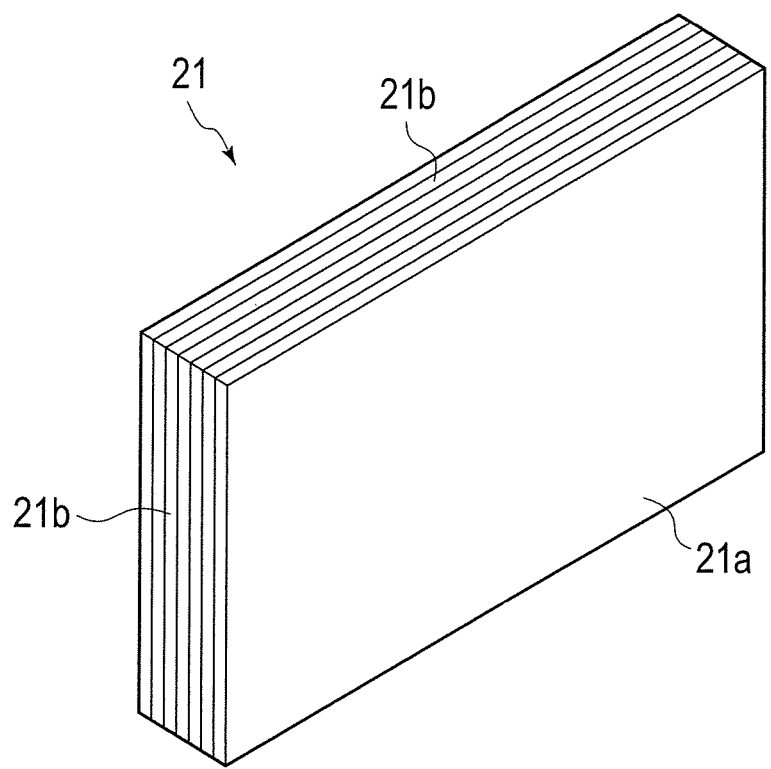
FIG. 3 is a schematic perspective view of a power generating element in the film-wrapped battery according to the first embodiment for explaining the main surfaces and stack side surfaces of the power generating element.

As shown in FIG. 1, the power generating element 21 is formed by alternately stacking multiple negative electrode plates (negative electrodes) 14 and multiple positive electrode plates (positive electrodes) 16 each having a substantially rectangular shape with electrolyte layers 17 each having a substantially rectangular shape therebetween. Each negative electrode plate (negative electrode) 14 is formed of a negative-electrode current collector 11 and negative-electrode active material layers 13 formed on both surfaces of the negative-electrode current collector 11. Each positive electrode plate (positive electrode) 16 is formed of a positive-electrode current collector 12 and positive-electrode active material layers 15 formed on both surfaces of the positive-electrode current collector 12. Moreover, each electrolyte layer 17 is obtained by impregnating a porous separator (including a nonwoven fabric separator) with the electrolyte solution 20. Specifically, a negative electrode plate (negative electrode) 14, an electrolyte layer 17, and a positive electrode plate (positive electrode) 16 are stacked in this order multiple times, and one of the negative-electrode active material layers 13 of the negative electrode plate 14 and the adjacent one of the positive-electrode active material layers 15 of the positive electrode plate 16 are set to face each other with the electrolyte layer 17 therebetween to form one unit battery layer 19. Thus, the film-wrapped battery 10 of this embodiment can be said to have a structure in which multiple unit battery layers 19 are stacked to be electrically connected to each other in parallel. Note that each of the outermost negative-electrode current collectors located at the two outermost layers in the power generating element 21 has a negative-electrode active material layer 13 only on one surface, but the negative-electrode active material layer 13 may be provided on both surfaces. That is, a current collector with active material layers on both surfaces may be used for each outermost current collector, instead of using the current collector with an active material layer only on one surface designed exclusively for each outermost layer. Moreover, the layout of the positive electrodes and the negative electrodes may be reversed from that in FIG. 1 such that outermost positive-electrode current collectors are located at both outermost layers in the power generating element 21, and a positive-electrode active material layer 15 may be disposed on one or both surfaces of each outermost positive-electrode current collector. Hereinbelow, in this embodiment, as shown in FIG. 3, the surfaces of the power generating element 21 seen from the stacking direction will be referred to as main surfaces 21a, and the surfaces of the power generating element 21 seen from the lateral directions with respect to the stacking direction will be referred to as stack side surfaces 21b.

As shown in FIG. 1, negative-electrode active material layers (negative electrodes) 13 are applied to and formed on both surfaces of the negative-electrode current collector 11 (e.g. a copper foil) of each negative electrode plate 14, and positive-electrode active material layers (positive electrodes) 15 are applied to and formed on both surfaces of the positive-electrode current collector 12 (e.g. an aluminum foil) of each positive electrode plate (positive electrode) 16. The negative-electrode current collector 11 and the positive-electrode current collector 12 extend outward from the stacking region. Specifically, as shown in FIGS. 1 and 2B, the extending portions 11a on the negative plate electrode side and the extending portions 12a on the positive electrode plate side as extending portions of the current collectors 11 and 12 coated with no electrode material are joined together by ultrasonic welding. As a result, the positive-electrode current collecting portions 12b and the negative-electrode current collecting portions 11b as relays are formed. At the same time, the negative-electrode current collecting portions 11b are connected to the negative-electrode tab 25 and the positive-electrode current collecting portions 12b are connected to the positive-electrode tab 27 by the ultrasonic welding.

As one example of the laminate film wrapping member 29, one rectangular laminate film is folded in half to sandwich and enclose the power generating element 21 from both sides in its thickness direction, as mentioned earlier. The laminate film used as the wrapping member 29 is one obtained by stacking a thermal fusion resin layer having a thermal fusion property, a metal layer (e.g. an aluminum foil) and a (insulative) protection layer. To give an example, with a thermal fusion resin layer of PP (polypropylene) as a layer situated inside the film-wrapped battery 10 of this embodiment, thermal fusion portions of outer peripheral portions (outer edge portions) of the laminate film wrapping member 29 are thermally fused to each other, thereby forming the closing portions (seal portions) 29f. As a result, the power generating element 21 housed therein is closed (tightly closed or sealed with insulation). Note that the laminate film wrapping member 29 of this embodiment is not at all limited to the structure described above, and various, conventionally known types of laminate film wrapping members can be used as appropriate.

As the electrolyte solution 20, one with 1 mol/liter of $LiPF_6$ as the supporting electrolyte and with a mixed catalyst of propylene carbonate and ethylene carbonate (mass ratio of 50:50) as the solvent, or the like can be used. However, in this embodiment, the electrolyte solution 20 is not at all limited to these. That is, the electrolyte solution 20 is in a form obtained by dissolving an appropriate amount of a supporting electrolyte into a solvent. As the solvent, it is possible to use, for example, carbonates such as dimethyl carbonate (DMC) and diethyl carbonate (DEC), in addition to ethylene carbonate (EC) and propylene carbonate (PC) mentioned above. Only one of these may be used alone, or two or more of these may be used together. Moreover, as the supporting electrolyte, it is possible to use $Li(CF_3SO_2)_2N$, $Li(C_2F_5SO_2)_2N$, $LiAsF_6$, $LiTaF_6$, $LiClO_4$, $LiCF_3SO_3$, and the like, in addition to $LiPF_6$ mentioned above. Only one of these may be used alone, or two or more of these may be used together. Moreover, the concentration of the supporting electrolyte may be determined flexibly within a range of about 0.5 to 2 mol/litter, but the concentration is not at all limited to this range.

<Device for Manufacturing Film-Wrapped Battery>

Now, the structure of an injection-impregnation device in this embodiment for injecting and impregnating film-wrapped battery cells with the electrolyte solution will be described with reference to drawings.

Figure 4:
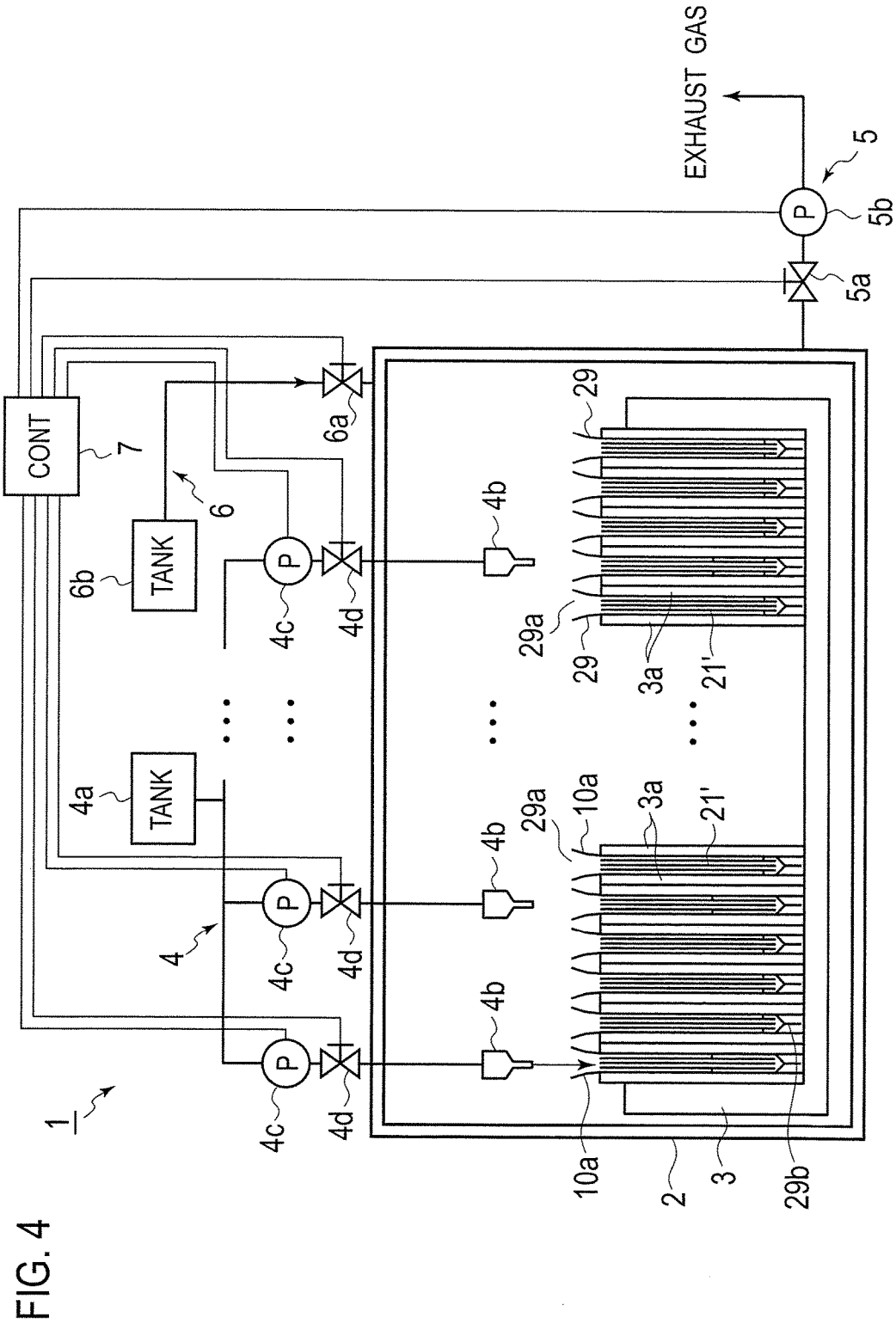
FIG. 4 is a schematic diagram showing the structure of an injection-impregnation device for injecting and impregnating, with electrolyte solution, the inside of a bag-shaped laminate film wrapping member having an opening portion housing an electrode assembly (battery cell), as one representative embodiment (first embodiment) of a device for manufacturing a film-wrapped electrical device of the present invention.

FIG. 4 is a schematic diagram showing the structure of an injection-impregnation device for injecting and impregnating film-wrapped battery cells with the electrolyte solution, as one representative embodiment (first embodiment) of a method for manufacturing a film-wrapped electrical device of the present invention.

As shown in FIG. 4, an injection-impregnation device 1 of this embodiment includes an injection chamber 2, an injection magazine 3 with holding jigs 3a, an electrolyte-solution supply line 4, an air discharge line 5, a gas introduction line 6, and a controller 7.

The controller 7 controls the operation of the holding jigs 3a, a vacuum pump 5b connected to the air discharge line 5, and an electrolyte-solution storage tank 4a connected to the electrolyte-solution supply line 4. The operation of each part to be controlled by the controller 7 will now be described below in detail.

Inside the injection chamber 2, there is installed the injection magazine 3 with the holding jigs 3a for housing a large number of battery cells 10a in which the electrolyte solution 20 is not yet injected. The electrolyte-solution supply line 4, the air discharge line 5, and the gas introduction line 6 are connected to wall surfaces of the injection chamber 2.

The holding jigs 3a the injection magazine 3 is equipped with are plate-shaped jigs (plate members) installed in such a way as to stably hold the large number of battery cells 10a in which the electrolyte solution is not yet injected. At the time of injecting the electrolyte solution 20 into bag-shaped laminate film wrapping members 29 each housing an electrode assembly 21' through opening portions 29a thereof, the holding jigs 3a can sandwich and hold the corresponding wrapping members 29 from both sides in the thickness direction of their electrode assemblies 21' (from the two main surfaces 21a sides; see FIG. 3).

Each laminate film wrapping member 29 housing the electrode assembly 21' and sandwiched by the holding jig 3a is formed in a bag shape. Specifically, the bag-shaped laminate film wrapping member 29 is thermally fused at all the sides except the opening portion 29a at the upper side, and only the opening portion 29a is left open, so as to obtain a bag shape that allows injection of the electrolyte solution 20 through the opening portion 29a into the bag-shaped laminate film wrapping member 29 housing the electrode assembly 21'.

One end of the electrolyte-solution supply line 4 forming an injector device is connected to the storage tank 4a storing the electrolyte solution. The other end of the electrolyte-solution supply line 4 is divided in the middle into multiple systems and connected to an electrolyte-solution transfer pump 4c of each corresponding system. The electrolyte-solution transfer pump 4c is connected to a valve 4d. The controller 7 controls the opening and closing of the valve 4d and adjusts its opening degree, thereby allowing injection of the electrolyte solution little by little in installments for each system. The electrolyte-solution transfer pump 4c and the valve 4d are installed outside the injection chamber 2 and connected to an injection nozzle 4b provided inside the injection chamber 2. Each injection nozzle 4b at the other end of the electrolyte-solution supply line 4 is disposed in such a way as to coincide with the opening portion 29a of the corresponding laminate film wrapping member 29 opening upward so that the electrolyte solution 20 supplied from the electrolyte-solution supply line 4 can be injected through this opening portion 29a.

In this embodiment, each injection nozzle 4b is movable to upper sides of the opening portions 29a of multiple battery cells 10a arranged side by side in a predetermined sequence. Thus, one injection nozzle 4b can be used multiple times to supply the electrolyte solution 20 to multiple battery cells 10a. For example, a travel rail (not shown) provided inside the injection chamber 2 is conceivable as a structure that allows the injection nozzle 4b to be movable. By forming this rail along the moving path of the injection nozzle 4b, the injection nozzle 4b can be moved along a desired path.

The air discharge line 5 forming a pressure adjuster device (mainly as a depressurizer of the pressure adjuster device) mainly includes a valve 5a and the vacuum pump 5b and is connected to the controller 7 so that the inside of the injection chamber 2 can be evacuated and depressurized.

The gas introduction line 6 forming the pressure adjuster device (mainly as a pressurizer of the pressure adjuster device) introduces dry air or inert gas into the injection chamber 2 evacuated by the air discharge line 5 to thereby raise the internal pressure of the injection chamber 2 from the vacuum or depressurized state. This gas introduction line 6 mainly includes a valve 6a and a gas storage tank 6b, and the valve 6a and other parts are connected to the controller 7 so that the inside of the injection chamber 2 can be raised (pressurized or pressure-raised) from the vacuum or depressurized state.

<Method for Manufacturing Film-Wrapped Battery>

Now, steps included in a method for manufacturing a film-wrapped battery of this embodiment will be described.

<Method for Injection and Impregnation with Electrolyte Solution>

Figure 5:
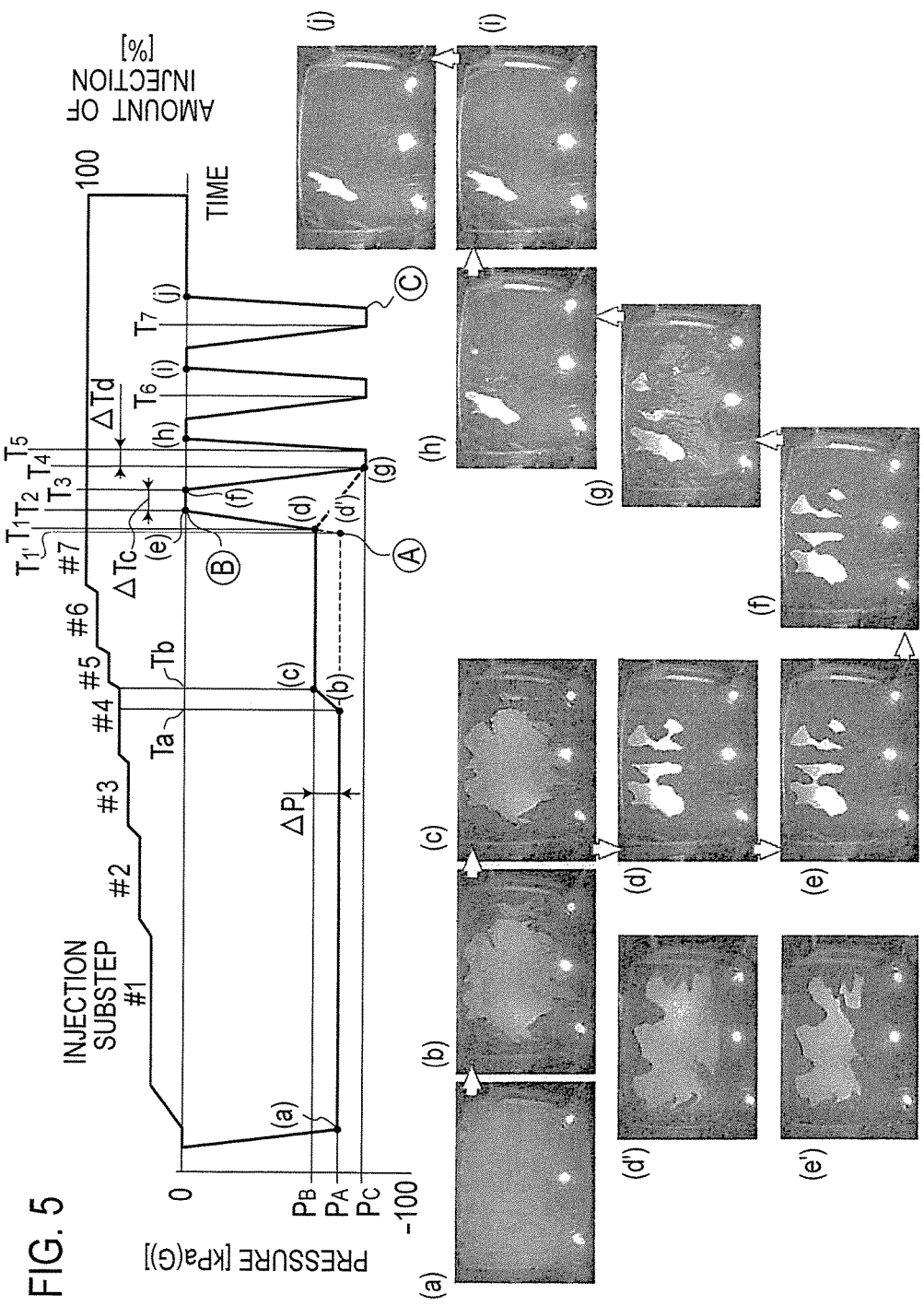
FIG. 5 shows the profile of injection and images presenting the state of impregnation in a method for injection and impregnation with electrolyte solution by the injection-impregnation device of this embodiment.
Figure 6:
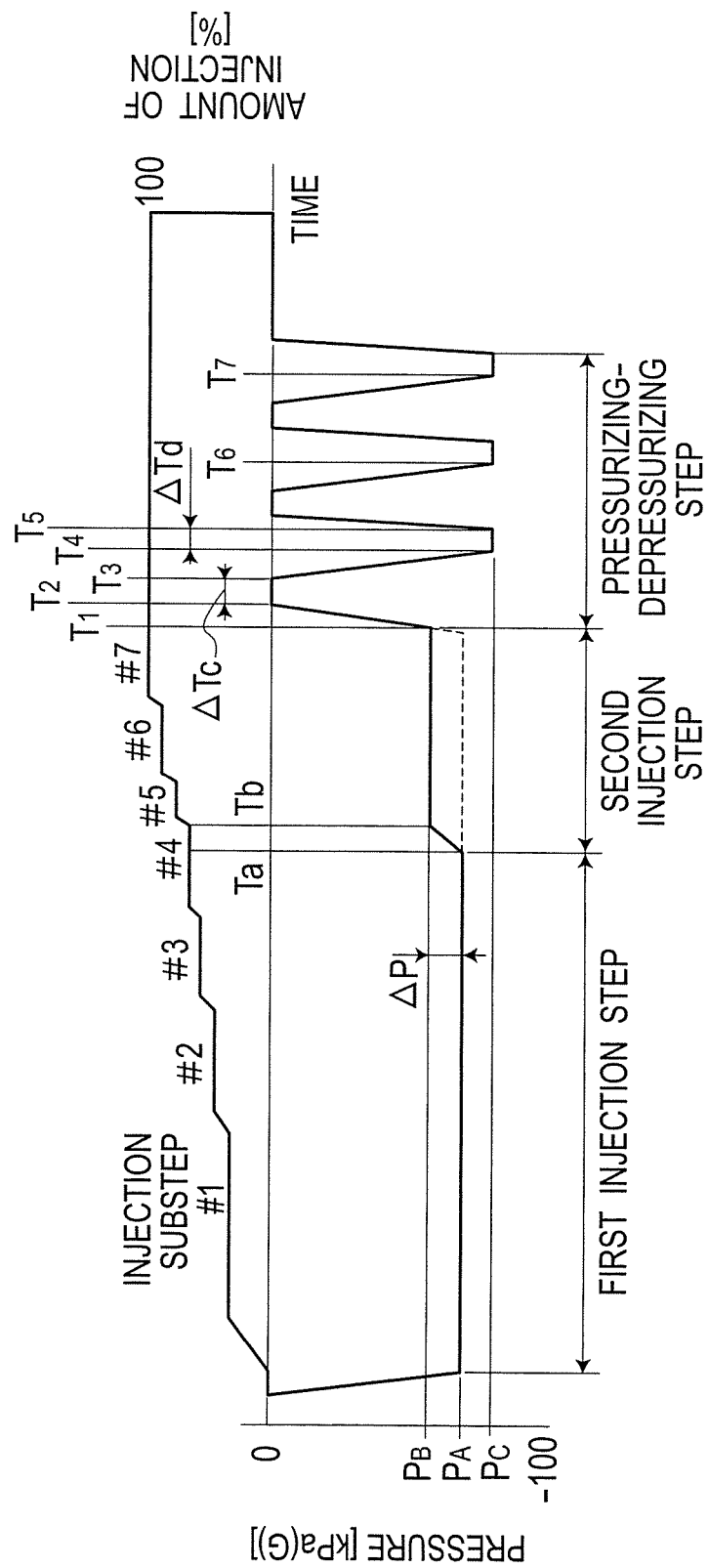
FIG. 6 is a diagram showing the amount of injection and the pressure in each of injection substeps in the method for injection and impregnation with electrolyte solution by the injection-impregnation device of this embodiment.
Figure 7:
FIG. 7 shows images of how bubbling occurs during the injection.
Figure 7:

A method for injection and impregnation with the electrolyte solution 20 by the injection-impregnation device 1 of this embodiment for injecting and impregnating film-wrapped battery cells with the electrolyte solution will be described below with reference to drawings. FIG. 5 shows the profile of injection and images presenting the state of impregnation in the method for injection and impregnation with the electrolyte solution 20 by the injection-impregnation device 1 of this embodiment. FIG. 6 is a diagram showing the amount of injection and the pressure in each of injection substeps in the method for injection and impregnation with the electrolyte solution 20 by the injection-impregnation device 1 of this embodiment. FIG. 7 shows images of how bubbling occurs during the injection.

Note that (a) to (j) in FIG. 5 are images showing how the surface of the battery at the left end in the injection magazine 3 becomes impregnated with the electrolyte solution from the start to the end of the injection and further in pressure manipulation after the injection. Areas depicted in white in the images correspond to non-injected portions of an outermost separator provided at the surface of the battery, before impregnated with the electrolyte solution. On the other hand, areas depicted in black correspond to portions of the outermost separator provided at the surface of the battery, after impregnated with the electrolyte solution. An electrode is usually located at each surface of a battery as shown in FIG. 1. However, in the images, a separator is further installed at each surface of the battery so as to make it easier to monitor the state of the impregnation of the separator with the electrolyte solution. As described above, the film-wrapped battery of this embodiment does not at all exclude cases where a separator is installed at each outermost layer of an electrode assembly.

The graphs shown in FIGS. 5 and 6 show the relation between the time and the amount of the electrolyte solution injected into a battery cell 10a through its injection nozzle 4b in FIG. 4.

FIG. 7(a) is an image showing an injected state according to a conventional practice in which bubbling and spattering of the electrolyte solution have occurred as a result of increasing the degree of the depressurization during the injection to a pressure at which air expansion that impairs the impregnation with the electrolyte solution occurs (i.e. as a result of setting a high degree of vacuum). FIG. 7(b) is an image showing an injected state of this embodiment in which the bubbling is suppressed and thereby the spattering of the electrolyte solution is suppressed by reducing the degree of the depressurization during the injection to a pressure at which air expansion that impairs the impregnation with the electrolyte solution does not occur.

In the method for injection and impregnation with the electrolyte solution 20 of this embodiment, the pressure (depressurization) is brought back toward atmospheric pressure (below atmospheric pressure) and maintained for a certain period of time during the injection of the electrolyte solution 20 through the opening portion 29a of the bag-shaped laminate film wrapping member 29 housing the electrode assembly 21'. Specifically, as shown in FIGS. 5 and 6, the pressure (depressurization) is raised toward atmospheric pressure (below atmospheric pressure) between injection substeps #4 and #5, and that pressure is maintained for a certain period of time between injection substeps #5 and #7. To do so, the electrolyte solution 20 is injected through the following procedure.

<Depressurization Step>

As shown in FIG. 4, the multiple battery cells 10a are aligned inside the injection chamber 2. Through the controller 7, the vacuum pump 5b of the air discharge line 5 is driven with the valve 5a open to thereby depressurize the inside of the injection chamber 2 to a pressure lower than atmospheric pressure. The valve 5a is closed once a predetermined degree of vacuum is reached. In this state, the inside of the injection chamber 2 including the inside of the electrode assemblies 21' is evenly depressurized to a predetermined pressure. Note that as shown in FIG. 5, in the injection stage (e.g. until a time $T_1$ in FIG. 5), it is desirable to set the inside to a pressure (e.g. a pressure $P_A$ or $P_B$ in FIG. 5) higher than the degree of the depressurization during the pressure manipulation performed after the injection is completed (e.g. a pressure $P_C$ at times $T_4$, $T_5$, $T_6$, and $T_7$ in FIG. 5). In this way, it is possible to effectively prevent the bubbling and spattering of the electrolyte solution 20 while the separators and the like are impregnated therewith in the injection stage (see and compare FIGS. 7(b) and 7(a)). Moreover, as shown in FIGS. 5 and 6, the degree of the depressurization inside the injection chamber 2 only needs to be a pressure lower than atmospheric pressure, but it is preferable to depressurize the inside to as close to vacuum as possible preferably within a range within which the electrolyte solution 20 does not boil and bubble intensely. As a result, unwanted air (gas) inside the battery cells 10a is expelled, thereby preventing formation of gas pools and thus allowing sufficient impregnation with the electrolyte solution. The pressure is preferably not greater than 5 kPa, more preferably not greater than 3 kPa, and particularly preferably within a range of about 1.5 to 2 kPa. However, in this embodiment, the pressure is not at all limited to these ranges.

By the time the depressurization step is completed, as illustrated in FIG. 5(a), the separators are not yet impregnated with the electrolyte solution, and the entire surfaces are white.

<First Injection Step>

Next, part of a predetermined injection amount (prescribed electrolyte-solution amount) of the electrolyte solution is injected into the wrapping member 29 through the opening portion 29a with the inside of the injection chamber 2 kept at the pressure obtained in the depressurization step (a pressure lower than atmospheric pressure, e.g. the pressure $P_A$ in FIG. 5).

Specifically, part of the predetermined injection amount (prescribed electrolyte-solution amount) of the electrolyte solution 20 is injected little by little in installments (four installments in FIGS. 5 and 6) into the opening portion 29a on the upper side of the wrapping member 29 from the electrolyte-solution supply line 4 through the injection nozzle 4b. For example, approximately 60% of the predetermined injection amount (prescribed electrolyte-solution amount) of the electrolyte solution 20 is injected as shown in the injection profile in FIGS. 5 and 6.

The electrode assembly 21' is adequately held in the thickness direction by the entire main surfaces of plate members of the holding jig 3a. Thus, there is not formed any gap for the electrolyte solution 20 flow to a center portion of each main surface 21a side of the electrode assembly 21'. Moreover, with the holding jig 3a holding the electrode assembly 21', the gaps between the multiple positive electrode plates, separators, and negative electrode plates forming the electrode assembly 21' are also small. Thus, the electrolyte solution 20 almost never flows between the multiple positive electrode plates, separators, and negative electrode plates. Further, since the inside of the injection chamber 2 including the inside of the electrode assembly 21' is evenly depressurized to a predetermined pressure (e.g. the pressure $P_A$), the electrolyte solution 20 never gets sucked into the electrode assembly 21' by the negative pressure in the electrode assembly 21'. Thus, in the first injection step, part of the predetermined injection amount (prescribed electrolyte-solution amount) of the electrolyte solution 20 (approximately 60% of the entire amount in FIGS. 5 and 6) is injected little by little in installments until an outer peripheral portion of the electrode assembly 21' becomes impregnated with the electrolyte solution 20 (see (b) in FIG. 5).

Specifically, as shown by the impregnated state in (b) in FIG. 5, by the time the first injection step is completed, each main surface 21a side of the electrode assembly 21' is not yet impregnated with the electrolyte solution 20 to the center portion and the impregnated state of the center portion of the separator remains in white as well, indicating no impregnation so far. Note that as shown in FIGS. 5 and 6, the electrolyte solution 20 is injected little by little in installments in this step for the purpose of preventing the electrolyte solution from overflowing out of the wrapping member 29 and spattering. It takes time to impregnate the electrode assembly 21' with the electrolyte solution. If the amount of the electrolyte solution which the electrode assembly 21' will eventually be impregnated with is all injected at once while the electrode assembly 21' is still in the middle of impregnation, the electrolyte solution may possibly overflow out of the wrapping member 29. Note that although the electrolyte solution 20 is injected little by little in installments in this step, there is still no gap for the electrolyte solution 20 to quickly flow into. Accordingly, the electrolyte solution 20 gradually permeates (impregnate) the electrode assembly 21' from its outer peripheral portion which can be impregnated relatively easily (i.e. a portion in which a small gap is present and to which less pressing force is applied) (see (b) in FIG. 5) while subtly bubbling on the upper side of the electrode assembly 21' (see FIG. 7(b)). Note that as shown in FIGS. 5 and 6, the pressure during this step is maintained constant by keeping the state after the depressurization in the previous step to a pressure lower than atmospheric pressure (e.g. the pressure $P_A$).

Moreover, in this step, part of the predetermined injection amount (prescribed electrolyte-solution amount) of the electrolyte solution 20 is injected little by little in installments into the battery cell 10a through the injection nozzle 4b. Specifically, as shown by the graph of the injection profile shown in FIGS. 5 and 6, the injection is performed stepwise in four installments from the injection substeps #1 to #4 up to about 60% of the predetermined injection amount (prescribed electrolyte-solution amount).

According to the injection profile shown in FIGS. 5 and 6, one battery cell 10a is injected in one injection substep, and then that battery cell 10a is injected again in the next injection substep. During the period after the injection of one battery cell 10a until the next injection of that battery cell 10a, a different battery cell 10a aligned with the one battery cell 10a is injected. While the different battery cell 10a is injected, the one battery cell 10a is not injected and remains as is, and during this period (a certain period of time after each injection) its impregnation with the electrolyte solution progresses. Note that in this embodiment, the injection is not at all limited to the above. The number of times injection is performed, the amount of injection, the duration of injection, the degree of the depressurization, and the like can be flexibly determined according to the size and shape of the battery, the concentration of the electrolyte solution, and the like. For example, it is desirable to minimize the number of times injection is performed within such a range that a large amount of the electrolyte solution will not be injected, thus preventing it from overflowing or spattering, to thereby inject the electrolyte solution efficiently and effectively and shorten the injection duration. Increasing the number of times injection is performed may make the duration of injection of the electrolyte solution shorter depending upon the pressure condition. In this case, it is desirable to increase the number of times injection is performed.

Moreover, as described above, the number of times injection is performed and the like should be optimally determined along with optimization of various conditions. As shown in FIG. 6, the amount of injection tends to decrease as the injection substep number increases in the injection step. For this reason, the amount of injection performed in the state where a pressure lower than atmospheric pressure is kept is desirably about 50 to 70% of the predetermined injection amount (prescribed electrolyte-solution amount). In this way, it is possible to prevent spattering of the electrolyte solution and to shorten the duration of injection of the electrolyte solution at the same time. The duration of injection can be flexibly determined based on the degree of vacuum and the rate of impregnation of the electrode assembly. The degree of the depressurization is desirably a degree of vacuum set to be as high as possible within such a range that boiling and intense bubbling of the electrolyte solution can be prevented, which would otherwise cause scattering thereof as described above. This is because if air remains inside the battery cell 10a, the electrolyte solution cannot permeate the portion with the residual air in the injection stage, and a gas pool may possibly be formed.

Moreover, the number of battery cells and the number of injection nozzles should be determined flexibly. For example, the number of battery cells 10a and the number of injection nozzles 4b may be set to be equal and fixed nozzles may be used so that the movable mechanism, the system for controlling it, and the like can be omitted. In this way, system troubles can be reduced. Moreover, depending on the size of the injection chamber 2, multiple injection magazines may be installed on a flat surface, or multiple injection magazines may be installed in such a way as to be stacked vertically with a proper gap therebetween, or these may be combined. The injection magazine 3 may be designed such that the multiple battery cells 10a are arranged in a line as shown in FIG. 4 or designed such that the multiple battery cells 10a are arranged in multiple lines. Moreover, the injection magazine 3 may be of a box shape as shown in FIG. 4 or of a circular shape. In the case of a circular shape, the multiple battery cells 10a should be arranged side by side in the radial direction.

As described above, the amount of injection in each substep is decreased stepwise from the injection substeps #1 to #4 because as the injection substep proceeds from one to another, the electrode assembly 21' needs to be impregnated with the electrolyte solution 20 deeper toward the center from the peripheral portion, and the amount of the electrolyte solution 20 which the electrode assembly 21' can be impregnated with decreases stepwise as well. Thus, in a case of an injection method involving no change in the pressure inside the injection chamber 2 from the start of the injection to the end of the injection (e.g. a point with circled A in FIG. 5), it takes time to finish the impregnation after injecting the predetermined injection amount (prescribed electrolyte-solution amount), and a large area of the center portion of each separator of the electrode assembly 21' remains in the non-injected state even after the injection (see (a)→(b)→(d)' in FIG. 5). In contrast, in the case of the injection step of this embodiment, after the first injection step of this step, a subsequent step, or a second injection step, is performed. In this way, it is possible to significantly shorten the time taken to finish the injection and impregnation of the predetermined injection amount (prescribed electrolyte-solution amount). Further, it is possible to achieve a state where each separator of the electrode assembly 21' is injected almost completely to its center portion (see and compare (d) in FIG. 5 and (d)' in FIG. 5).

<Second Injection Step>

In this step, the pressure inside the injection chamber 2 is raised to a pressure (e.g. the pressure $P_B$) higher than the above-mentioned pressure (a pressure lower than atmospheric pressure, e.g. the pressure $P_A$), and then that pressure (the pressure after the pressure raising) is maintained for a certain period of time, during which the rest of the above-mentioned predetermined injection amount (prescribed electrolyte-solution amount) of the electrolyte solution is injected (see FIGS. 5 and 6).

Specifically, through the controller 7, the valve 6a of the gas introduction line 6 is opened to introduce the gas into the injection chamber 2, thereby raising the pressure to a pressure (e.g. the pressure $P_B$) higher than the above-mentioned pressure inside the injection chamber 2 (a pressure lower than atmospheric pressure, e.g. the pressure $P_A$) (details are shown in the injection profile in FIGS. 5 and 6; see a pressure raising stage from a time Ta to a time Tb). By this operation, the impregnated state of each main surface 21a side of the electrode assembly 21' shifts like the change from (b) in FIG. 5 to (c) in FIG. 5. However, no significant change is observed in the impregnated state of each separator between before and after the pressure raising, and the center portion remains in white. This is because the electrolyte solution 20 is not injected during the pressure raising operation, and there is not enough an amount of electrolyte solution necessary for impregnation to the center portion.

Then, after the pressure raising to a pressure (e.g. the pressure $P_B$) higher than the above-mentioned pressure (a pressure lower than atmospheric pressure, e.g. the pressure $P_A$), the valve 6a of the gas introduction line 6 is closed, and that pressure (the pressure after the pressure raising) is maintained for a certain period of time. During this period, the rest of the predetermined injection amount (prescribed electrolyte-solution amount) of the electrolyte solution 20 is injected little by little in installments (three installments in FIGS. 5 and 6) into the opening portion 29a on the upper side of the wrapping member 29 from the electrolyte-solution supply line 4 through the injection nozzle 4b. Specifically, as shown in the injection profile in FIGS. 5 and 6, the remaining approximately 40% of the predetermined injection amount (prescribed electrolyte-solution amount) of the electrolyte solution 20 is injected. By this operation, each main surface 21a side of the electrode assembly 21' can be impregnated with the electrolyte solution 20 to the center portion. Moreover, by injecting the entire predetermined injection amount (prescribed electrolyte-solution amount), the electrolyte solution 20 is filled to such an extent that its liquid level is situated above the upper end surface of the electrode assembly 21'. Note that the injection is insufficient if the liquid level is below the upper end surface of the electrode assembly 21' after the entire predetermined injection amount (prescribed electrolyte-solution amount) is injected. In this case, there is a possibility that part of electrodes and separators will be dried as a result of electric charge and discharge, and the battery performance will be deteriorated. The insufficient injection can be considered to occur due to, for example, spattering of part of the electrolyte solution during the injection which prevents the desired entire amount of the electrolyte solution from being injected into the battery cell 10a. Thus, in the above case, it is desirable to further inject the electrolyte solution 20 to fill it to such an extent that the liquid level is situated above the upper end surface of the electrode assembly 21'.

By the time this step is completed, as shown in (d) in FIG. 5, each main surface 21a side of the electrode assembly 21' is impregnated with the electrolyte solution 20 to the center portion, and the impregnated state of each separator is such that only some areas of the center portion is in white, indicating that sufficient impregnation can be achieved. This can be reasoned as follows. Specifically, the introduction of the gas instantly raises the pressure inside the injection chamber 2 to, for example, a pressure (e.g. the pressure $P_B$) higher than the above-mentioned pressure (e.g. the pressure $P_A$), but the inside of each electrode assembly 21' remains in the evacuated and depressurized state. Thus, a pressure difference is made between the inside of the electrode assembly 21' of each battery cell 10a and the inside of the injection chamber 2. That is, the inside of the electrode assembly 21' is in a higher vacuum state (depressurized state), and therefore when the electrolyte solution 20 is injected little by little in installments (three installments in FIGS. 5 and 6), the electrode assembly 21' is quickly impregnated with (absorbs) the electrolyte solution to the center portion by the negative pressure. As a result, the impregnability with the electrolyte solution improves, thus making it possible to shorten the duration of injection. Now, suppose that the electrolyte solution 20 is injected little by little in installments (seven installments in total in FIG. 5) to the point with circled A shown in FIG. 5 (time $T_1$') with the degree of the depressurization in the first injection step kept as is (without the pressure raising to a pressure (e.g. the pressure $P_B$) higher than the pressure at that time (e.g. the pressure $P_A$)). In this case, like the impregnated state in (d') in FIG. 5, the impregnation hardly progresses toward the center, resulting in a large non-impregnated area remaining in the center portion.

Note that this step may be repeated as an operation involving injection of a smaller amount of the electrolyte solution 20 in installments in a case where the amount of the electrolyte solution 20 is below the amount required for a film-wrapped battery 10.

In this step, when the pressure inside the injection chamber 2 is maintained for a certain period of time, that pressure (e.g. the pressure $P_B$) should desirably be lower than the half value between (the average value of) the pressure in the first injection step (e.g. the pressure $P_A$) and atmospheric pressure (see FIGS. 5 and 6). In this way, the pressure difference between the maintained pressure (e.g. the pressure $P_B$) and the pressure in the first injection step (e.g. the pressure $P_A$) is not too large, and therefore the scattering of the electrolyte solution can be prevented (see FIG. 7(b)). However, there is a possibility that a sufficient impregnability improving effect cannot be achieved as in the case of (d') in FIG. 5 if the pressure difference between the maintained pressure (e.g. the pressure $P_B$) and the pressure in the previous step (e.g. the pressure $P_A$) is too small. Hence, preferably, it is much preferable to provide a pressure difference of $\Delta P (=|P_A-P_B|)$ as shown in FIG. 6. It is desirable that this pressure difference $\Delta P$ be at least not smaller than 1 kPa, preferably not smaller than 10 kPa, and more preferably about 15 to 20 kPa. However, in this embodiment, the pressure difference $\Delta P$ is not at all limited to these ranges.

Meanwhile, in this step, the pressure inside the injection chamber 2 may be raised stepwise, and the electrolyte solution 20 may be injected with the pressure at each level maintained for a certain period of time. In this case, too, it is more desirable for the pressure inside the injection chamber 2 to satisfy the above-mentioned condition. By this operation, the impregnation (rate) can be accelerated stepwise, thereby making it possible to shorten the duration of injection. Borrowing, for example, to FIG. 6, the operation not illustrated herein may be done by raising the pressure inside the injection chamber 2 stepwise, for instance, from the pressure $P_A$ in the previous step to (1) 15 kPa to (2) 20 kPa to (3) 25 kPa and injecting the electrolyte solution 20 with the pressure at each level maintained for a certain period of time. For example, at the (1) level, a pressure of 15 kPa is maintained for five minutes, during which the electrolyte solution 20 is injected little by little in two installments, and the pressure is then raised to the pressure of the (2) level within the following one minute. Likewise, at the (2) level, a pressure of 20 kPa is maintained for five minutes, during which the electrolyte solution 20 is injected little by little in two installments, and the pressure is then raised to the pressure of the (3) level within the following one minute. Lastly, at the (3) level, a pressure of 25 kPa may be maintained for five minutes, during which the electrolyte solution 20 may be injected little by little in two installments. However, in this embodiment, the pressure raising is not at all limited to this manner. From the viewpoint that stepwise increasing the pressure can stepwise accelerate the impregnation (rate), it is more effective to make the duration for which the pressure is maintained and the amount of injection (and the number of times injection is performed) longer and larger at the (3) level (=the level at which the pressure difference from the previous step is the largest) than in the other levels.

Moreover, as shown in FIGS. 5 and 6, it is desirable to inject the electrolyte solution (little by little) in installments in each of the first injection step and the second injection step and to set the injection amount in each installment in the second injection step larger than the injection amount in the last installment in the first injection step. Specifically, as shown in FIGS. 5 and 6, it is desirable to set the injection amount in each installment in this step (injection substeps #5 to #7) larger than the injection amount in the last installment in the previous step (injection substep #4). As the pressure changes from the previous step to this step, the impregnation with the electrolyte solution occurs more easily in this step, and therefore the amount of injection can be increased accordingly. Hence, by the above operation, the duration of injection can be shortened. This advantageous effect can be achieved in the first to third injections (injection substeps #5 to #7) in this step. Lastly, the injection of the electrolyte solution 20 through the injection nozzle 4b is stopped. Specifically, drive motors of the electrolyte-solution transfer pump 4c, the valve 4d, and the injection nozzle 4b are stopped through the controller 7. The second injection step can now be finished, and the method for injection and impregnation with electrolyte solution of this embodiment can therefore be achieved.

As described above, in the method for injection and impregnation with electrolyte solution of this embodiment, a high pressure is maintained for a certain period of time. Thus, the impregnation utilizing a pressure difference can be accelerated, thereby making it possible to shorten the duration of injection. In addition, although a flexible laminate film is used as the wrapping member of the film-wrapped battery, no slack is formed between stack surfaces. Accordingly, it is possible to suppress formation of wrinkles on the separators during the injection of the electrolyte solution.

<Operations after Injection Step>

<Post-Process (1)>

As a post-process (1) after the second injection step, a closing step of closing the opening portion 29a is performed, and then a pressure raising step of bringing the pressure inside the injection chamber 2 back to atmospheric pressure is performed. As a result, the film-wrapped battery 10 in which the electrolyte solution is injected can be obtained. The closing step and the pressure raising step will be described.

<Closing Step>

In the closing step, the opening portion 29a is closed (tightly closed or sealed) by thermal fusion after the above-described injection step with the pressure maintained (for example, with the pressure $P_B$ at (d) in FIG. 5 kept) or lowered to a pressure (high vacuum state) as much as possible within such a range that the electrolyte solution will not boil. Then, in the case of the latter, through the controller 7, the vacuum pump 5b of the air discharge line 5 is driven with the valve 5a open to depressurize the inside of the injection chamber 2 to a lower pressure (high vacuum state) within such a range that the electrolyte solution will not boil. The valve 5a is closed once a predetermined degree of vacuum is reached. Thereafter, the opening portion 29a should be closed (tightly closed or sealed) by thermal fusion using a thermo-compression bonding (fusing) device (not shown) provided inside the injection chamber 2.

Note that during the first electric charge and discharge after the above operation, a unique phenomenon occurs in which a relatively large amount of gas is generated inside the film-wrapped battery 10, but such particular gas generation is hardly observed during the second and subsequent electric charge and discharge. For this reason, in the closing step, it is desirable to partially close the opening portion by thermal fusion and close (temporarily fasten) the remaining opening portion by using a suitable detachable closing member such as a clip such that the opening portion can be opened and closed. Then, after the first electric charge and discharge are performed in the subsequent step, it is desirable to detach the closing member such as a clip to open the opening portion, remove the relatively large amount of gas generated inside the film-wrapped battery 10 to the outside of the battery 10 (remove the gas by depressurization, for example), and finally close (tightly close or seal) the opening portion more securely by thermal fusion.

<Pressure Raising Step>

After the closing step, the pressure raising step of bringing the pressure inside the injection chamber 2 back to atmospheric pressure is performed. As a result, a film-wrapped battery 10 injected and impregnated with the electrolyte solution 20 can be obtained (taken out). Specifically, through the controller 7, the valve 6a of the gas introduction line 6 is opened to introduce the gas into the injection chamber 2 to thereby bring the pressure inside the injection chamber 2 back to atmospheric pressure. Accordingly, the method for injection and impregnation with the electrolyte solution 20 by the injection-impregnation device 1 of this embodiment is achieved.

<Post-Process (2)>

Meanwhile, in this embodiment, as a post-process (2), a pressurizing-depressurizing step of raising and lowering the pressure inside the injection chamber above and below the pressure in the injection step may be repeated after the injection step but before the closing of the opening portion as shown in FIGS. 5 and 6. Thereafter, a closing step and a pressure raising step similar to those in the above-described post-process (1) are sequentially performed. As a result, a film-wrapped battery 10 injected and more impregnated with the electrolyte solution can be obtained. The pressurizing-depressurizing step will be described.

<Pressurizing-Depressurizing Step>

In the pressurizing-depressurizing step, after the injection step but before the closing of the opening portion 29a, a pressurizing-depressurizing step of raising and lowering the pressure inside the injection chamber 2 above and below the pressure in the injection step (first and second injection steps) is performed. Thus, the pressurization and depressurization are performed after the completion of the injection but before the closing. In this way, the impregnation can be accelerated. Since the step is after the injection, the electrolyte solution 20 is already held in each separator and will therefore not spatter when the pressurization and depressurization are performed, which is advantageous.

For example, as shown in FIGS. 5 and 6, the pressure inside the injection chamber 2 is raised above the pressure in the injection step (first and second injection steps) after the injection step (see (d) in FIG. 5) but before the closing of the opening portion 29a. Specifically, through the controller 7, the valve 6a of the gas introduction line 6 is opened to introduce the gas into the injection chamber 2 to thereby pressurize the inside of the injection chamber 2 to a pressure higher than the pressure in the injection step (see a pressure raising stage from the time $T_1$ to a time $T_2$ in FIGS. 5 and 6). When the pressurization is performed, the pressurization should desirably be done to atmospheric pressure as shown in FIGS. 5 and 6. This is because the pressurization to atmospheric pressure can provide a large pressure difference from the pressure during the injection and allows acceleration of the impregnation. In addition, bringing the pressure back to atmospheric pressure only requires stopping the evacuation and can therefore be realized with a simple structure, which is also advantageous. By this operation, the impregnated state of each main surface 21a side of the electrode assembly 21' is improved, and the impregnation in the center portion is accelerated like the change from (d) in FIG. 5 to (e) in FIG. 5. In addition, like (e) in FIG. 5, the electrode assembly 21' has been impregnated with the injected electrolyte solution 20, and thus the pressure can be brought back to atmospheric pressure within a short period of time by the abrupt pressurization (pressure raising) shown in FIGS. 5 and 6 without the spattering of the electrolyte solution 20 having permeated. Accordingly, the injection step is shortened.

Note that the impregnated state would be like (e') in FIG. 5 if the electrolyte solution 20 is injected with the pressure inside the injection chamber 2 kept at a pressure lower than atmospheric pressure (e.g. the pressure $P_A$) until the point with circled A shown in FIG. 5, and the pressure inside the injection chamber 2 is then brought back to atmospheric pressure at a point with circled B shown in FIG. 5. Specifically, no significant change occurs from the impregnated state at the point with circled A shown in FIG. 5 ((d') in FIG. 5) and the impregnation toward the center is not sufficiently accelerated, resulting in a large non-impregnated area remaining in the center portion.

It is desirable to maintain the pressure for a certain period of time during the pressurization as shown in FIGS. 5 and 6 (see a stage where atmospheric pressure is maintained for a period of time $\Delta Tc$ from the time $T_2$ and a time $T_3$ in FIGS. 5 and 6). The impregnation can be accelerated by maintaining the pressure for a certain period of time during the pressurization. By this operation, the impregnated state of each main surface 21a side of the electrode assembly 21' shifts like the change from (e) in FIG. 5 to (f) in FIG. 5, so that the impregnation in the center portion is further accelerated. During this period, the inside of the electrode assembly 21' is pressurized, so that a pressure difference larger than that in the injection step is obtained, and therefore the electrode assembly 21' is impregnated with the injected electrolyte solution 20 deeper toward the center.

In this step, the pressure inside the injection chamber 2 is also lowered after the pressurization. When the pressure is lowered, the pressure should desirably be lowered to a pressure (e.g. the pressure $P_C$) lower than the pressure during the injection in the injection step (specifically, both the first and second injection steps). In this operation, through the controller 7, the vacuum pump 5b of the air discharge line 5 is driven with the valve 5a open to depressurize the inside of the injection chamber 2 preferably to a pressure lower than the pressure during the injection in the injection step. The valve 5a is closed once a predetermined degree of vacuum is reached. Since the pressure is lowered below the pressure during the injection in this step, the electrolyte solution 20 is more condensed than it was during the injection, thereby allowing further permeation. During this period, like the impregnated state in (g) in FIG. 5, the electrolyte solution 20 is condensed and thereby further permeates (impregnates) the inside of the electrode assembly 21', so that the impregnation progresses to the center portion of each separator. As a result, the non-impregnated white areas in the center portion are further reduced (see (g) in FIG. 5). Moreover, although the pressure is abruptly lowered to a pressure (e.g. the pressure $P_C$) lower than the pressure during the injection as shown in FIG. 5, boiling of the electrolyte solution 20 having permeated is suppressed. Thus, it is possible to lower the pressure within a short period of time without the spattering of the electrolyte solution. In other words, with the pressurizing-depressurizing step in this embodiment, it is possible to significantly shorten the time required for the impregnation with the electrolyte solution after its injection.

Moreover, in this step, it is desirable to maintain the pressure for a certain period of time during both the pressurization and the depressurization, and to set the pressure maintaining time during the pressurization longer than the pressure maintaining time during the depressurization. This is because the impregnation progresses more easily during the pressurization, and increasing the length of that period can accelerate the impregnation. Specifically, for example, as shown in FIGS. 5 and 6, atmospheric pressure is maintained for the period of time $\Delta Tc$ from the time $T_2$ to the time $T_3$ during the pressurization, while the pressure $P_C$ lower than the pressure during the injection is maintained for a period of time $\Delta Td$ from a time $T_4$ to a time $T_5$ ($\Delta Tc > \Delta Td$) during the depressurization.

Further, in this step, it is desirable to repeat the pressurization-depressurization cycle multiple times (FIGS. 5 and 6 show an example of repeating three cycles). The impregnation can be accelerated further by performing multiple cycles. The impregnated states in (e) in FIG. 5 at the time of the pressurization in the first cycle, (f) in FIG. 5 after the pressure is maintained for a certain period of time after the pressurization, (g) in FIG. 5 at the time of the depressurization in the first cycle, (h) in FIG. 5 at the time of the pressurization in the second cycle, and (i) in FIG. 5 at the time of the pressurization in the third cycle indicate that repeating the pressurization-depressurization cycle multiple times further accelerates the impregnation.

In the steps and operations in the post-process (2), a closing step and a pressure raising step similar to those in the above-described post-process (1) are sequentially performed after the above-described pressurizing-depressurizing step. As a result, a film-wrapped battery 10 injected and impregnated with the electrolyte solution can be obtained (taken out). Note that in the case of the post-process (2), the opening portion 29a is closed (tightly closed or sealed) by thermal fusion with the pressure maintained at the pressure after the pressurizing-depressurizing step instead of the pressure after the injection, or lowered to a pressure (high vacuum state) as much as possible within such a range that the electrolyte solution will not boil. Once the pressure is raised thereafter, a battery cell with its impregnated state having shifted from (i) in FIG. 5 to (j) in FIG. 5 is obtained.

<Post-Process (3)>

Further, in this embodiment, as a post-process (3), a post-injection depressurizing step of lowering the pressure inside the injection chamber 2 to a pressure (e.g. the pressure $P_C$) lower than the pressure in the injection step may be performed after the injection step as shown in FIGS. 5 and 6. Thereafter, a pressurizing-depressurizing step similar to that in the post-process (2) is performed if necessary, and a closing step and a pressure raising step similar to those in the post-process (1) are performed. In this way, a film-wrapped battery 10 impregnated even further can be obtained.

<Post-Injection Depressurizing Step>

In the post-injection depressurizing step, the pressure inside the injection chamber 2 is lowered to a pressure lower than the pressure during the injection (first and second injection substeps) after the injection step. Since the pressure inside the injection chamber 2 is lowered to a pressure lower than the pressure during the injection, the electrolyte solution is more condensed than it was during the injection, thereby allowing further permeation. Specifically, as shown by thick hollow arrows in FIG. 5, depressurization is performed such that the pressure in (g) in FIG. 5 (the highest negative pressure $P_C$ after the injection) has a smaller value than the pressure in (b) in FIG. 5 (the highest negative pressure $P_A$ during the injection). In this operation, the pressure may be lowered to a pressure (e.g. the pressure $P_C$) lower than the pressure in the injection step by taking the shortest route (bold dotted line) from (d) in FIG. 5 to (g) in FIG. 5. It is, however, desirable to lower the pressure to a pressure (e.g. the pressure $P_C$) lower than the pressure in the injection step preferably by taking the solid line route of (d)→(e)→(f)→(g) in FIG. 5.

In this step, the pressure in the injection step is desirably a pressure at which air expansion that impairs the impregnation of the electrode assembly with the electrolyte solution does not occur, while the pressure in the post-injection depressurizing step is desirably a pressure at which the electrolyte solution does not boil. This is because the pressure before the completion of the injection should be set by focusing on the fact that there is a large amount of air remaining inside the electrode assembly 21' and excessive depressurization will cause bubbling and impair the progress of the impregnation (see FIG. 7(a)), while the pressure after the completion of the injection should be set by focusing not on the residual air but on prevention of the boiling point of the electrolyte solution from shifting to the work temperature. Note that the pressure at which air expansion that impairs the impregnation with the electrolyte solution does not occur only needs to be such a pressure that bubbling can be suppressed as shown in FIG. 7(b) and the impregnation with the electrolyte solution can progress. In a case where this pressure is exceeded, the pressure is assumed to be causing air expansion that cause intense bubbling as shown in FIG. 7(a) and causes the spattering and the like of the electrolyte solution, thereby impairing the impregnation with the electrolyte solution. Meanwhile, it is not particularly necessary to control the temperature in the injection chamber during the injection and after the completion of the injection, and the steps can be performed in a room temperature condition (within a range of about 0 to 40° C.). For this reason, the pressure focusing on obtaining a work temperature not exceeding the boiling point of the electrolyte solution, which is the work temperature after the completion of the injection, may be a pressure with circled C in FIG. 5 (high vacuum state). In the impregnated state at the point with circled C in FIG. 5 ((g) in FIG. 5), too, boiling of the electrolyte solution is not observed, indicating that the above-mentioned requirement is satisfied. Specifically, the above-mentioned requirement can be said to be satisfied as long as the pressure is within a range from atmospheric pressure to the highest negative pressure (the pressure at the time of depressurization after the injection such as the one with circled C in FIG. 5) shown in FIGS. 5 and 6.

Moreover, in this step, as shown in FIGS. 5 and 6, the pressure inside the injection chamber 2 may be raised in advance before this step but after the injection step (as the first and second injection steps). When the pressure is raised, the pressure should desirably be raised to atmospheric pressure. This is because raising the pressure to atmospheric pressure can provide a large pressure difference from the pressure during the injection and allows acceleration of the impregnation. In addition, bringing the pressure back to atmospheric pressure only requires stopping the evacuation and can therefore be realized with a simple structure, which is also advantageous. By this operation, the impregnated state of each main surface 21a side of the electrode assembly 21' is improved, and the impregnation in the center portion is accelerated like the change from (d) in FIG. 5 to (e) in FIG. 5. During this period, the inside of the electrode assembly 21' is pressurized, so that a pressure difference larger than that in the injection step is obtained, and therefore the electrode assembly 21' is impregnated with the injected electrolyte solution 20 deeper toward the center. In addition, like (e) in FIG. 5, the electrode assembly 21' has been impregnated with the injected electrolyte solution 20, and thus the pressure can be brought back to atmospheric pressure within a short period of time by the abrupt pressurization (pressure raising) shown in FIGS. 5 and 6 without the spattering of the electrolyte solution 20 having permeated. Accordingly, the injection step is shortened.

Further, when the pressurization (pressure raising) is performed in advance after the injection step, it is desirable to maintain the pressure for a certain period of time as shown in FIGS. 5 and 6 (see the stage where atmospheric pressure is maintained for the period of time ΔTc from the time $T_2$ and the time $T_3$ in FIGS. 5 and 6). The impregnation can be accelerated by maintaining the pressure for a certain period of time during the pressurization. By this operation, the impregnated state of each main surface 21a side of the electrode assembly 21' shifts like the change from (e) in FIG. 5 to (f) in FIG. 5, indicating that the impregnation in the center portion is further accelerated. During this period, the inside of the electrode assembly 21' is pressurized, so that a pressure difference larger than that in the injection step is obtained, and therefore the electrode assembly 21' is impregnated with the injected electrolyte solution 20 deeper toward the center.

As described above, in the post-injection depressurizing step in this embodiment, the pressure inside the injection chamber 2 is lowered to a pressure lower than the pressure in the injection step after pressurization if necessary. However, it is needless to say that the pressure inside the injection chamber may be lowered to a pressure lower than the pressure in the injection step after the injection without the pressurization.

<Improvement in Injection with Electrolyte Solution>

Next, the method for injection and impregnation with, the electrolyte solution 20 of this embodiment will be described with reference to FIG. 4. The power generating element 21 is impregnated with the electrolyte solution 20 from each stack side surface 21b side of the electrode assembly 21'. The power generating element 21 in a rectangular shape has four stack side surfaces 21b, and it is important to effectively use all these four stack side surfaces 21b to inject the electrolyte solution 20 in view of shortening the duration of injection and preventing formation of wrinkles on the laminate film wrapping member 29. Thus, in each injection, the injection nozzle 4b may inject a predetermined amount of the electrolyte solution 20 in such a way as to evenly distribute it from one end to the other end of the opening portion 29a by traveling from the one end to the other end of the opening portion 29a. Further, in each injection, an injection nozzle 4b capable of tilting (moving) its tip upwardly from the lowest position to the left and right by about 45° may be used to inject the predetermined amount of the electrolyte solution 20 in such a way as to evenly distribute it from the one end to the other end of the opening portion 29a. However, in this embodiment, the injection is not at all limited particularly to this manner, and an existing injection-impregnation method capable of even injection cab be selected as appropriate.

As described above, the method and the device for manufacturing a film-wrapped battery of this embodiment, particularly, the method and device for injecting and impregnating film-wrapped battery cells with electrolyte solution achieve the following operations and effects. (1) Injection is performed with the inside of the injection chamber kept at a pressure lower than atmospheric pressure, and injection is then performed with the inside maintained at a pressure higher than that pressure for a certain period of time. Thus, the impregnation can be accelerated by utilizing the pressure difference. Moreover, (2) the above-mentioned pressure maintained for the certain period of time is set lower than the half value between the lowered pressure in the first injection step and atmospheric pressure. Thus, the pressure difference from the previous pressure is never too large. Accordingly, the spattering can be prevented. (3) The pressure is raised stepwise, and the injection is performed with the pressure at each level maintained for a certain period of time. Thus, the impregnation can be accelerated stepwise. (4) The injection amount in each installment under the pressure higher than the pressure lower than atmospheric pressure is set larger than the injection amount in the last installment under the above-mentioned pressure lower than atmospheric pressure. The change in pressure makes the impregnation easier, and the amount of injection can be increased accordingly. Thus, the duration of injection can be shortened.

While embodiments of the present invention have been described hereinabove, these embodiments are just illustration of mere examples described for the purpose of facilitating understanding of the present invention, and the present invention is not limited to the embodiments. The technical scope of the present invention is not limited to the specific technical matters disclosed in the embodiments but encompasses various modifications, changes, alternative techniques, and the like which can be derived therefrom.

This application is based upon and claims priority from Japanese Patent Application No. 2012-024426, filed on Feb. 7, 2012, the entire contents of which are incorporated herein by reference.

INDUSTRIAL APPLICABILITY

According to the present invention, after the steps of depressurizing the inside of the injection chamber to a pressure lower than atmospheric pressure and injecting part of the predetermined injection amount of the electrolyte solution into the wrapping member, the inside of the injection chamber is pressurized to be higher than that pressure, and the rest of the predetermined injection amount of the electrolyte solution is injected. Accordingly, the impregnation utilizing a pressure difference can be accelerated. As a result, it is possible to provide a method and a device for manufacturing a film-wrapped electrical device with which uneven impregnation with electrolyte solution is prevented, and the electrolyte solution can be injected within a short period of time.

REFERENCE SIGNS LIST 1 device for injection and impregnation with electrolyte solution
2 injection chamber
3 injection magazine
3a holding jig
4 electrolyte-solution supply line
4a electrolyte-solution storage tank
4b injection nozzle
4c electrolyte-solution transfer pump on electrolyte-solution supply line
4d open-close valve or solution-flow-rate adjustment valve on electrolyte-solution supply line
5 air discharge line
5a air-discharge open-close valve
5b air-discharge vacuum pump
6 gas introduction line
6a open-close valve or gas-flow-rate adjustment valve on gas introduction line
6b gas storage tank
7 controller
10 film-wrapped battery (film-wrapped electrical device)
10a film-wrapped battery cell
11 negative-electrode current collector
11a negative-electrode extending portion (from current collector)
11b negative-electrode current collecting portion
12 positive-electrode current collector
12a positive-electrode extending portion (from current collector)
12b positive-electrode current collecting portion
13 negative-electrode active material layer
14 negative electrode plate (=negative electrode)
15 positive-electrode active material layer
16 positive electrode plate (=positive electrode)
17 electrolyte layer (separator impregnated with electrolyte solution)
19 unit battery layer
20 electrolyte solution
20a droplet of electrolyte solution
21 power generating element
21a main surface of power generating element
21b stack side surface of power generating element
25 negative-electrode tab
27 positive-electrode tab
29 laminate film wrapping member
29a opening portion of laminate film wrapping member
29b bottom portion of laminate film wrapping member
29e recessed portion of laminate film wrapping member
29f closing portion of seal portion of laminate film wrapping member

The invention claimed is:
1. A method for manufacturing a film-wrapped electrical device, comprising:
a first injection step of
depressurizing, to a given pressure lower than atmospheric pressure, an inside of an injection chamber in which a bag-shaped laminate film wrapping member is placed, the laminate film wrapping member having an opening portion and housing an electrode assem- bly including a positive electrode and a negative electrode stacked with a separator therebetween, and
injecting part of a predetermined injection amount of an electrolyte solution into the laminate film wrapping member through the opening portion; and
a second injection step of, after the first injection step, pressurizing the inside of the injection chamber to a pressure higher than the given pressure and lower than an average value of the given pressure and atmospheric pressure, and injecting the rest of the predetermined injection amount of the electrolyte solution into the laminate film wrapping member through the opening portion, wherein
in each of the first injection step and the second injection step, the solution is injected in installments,
a total injection amount in the first injection step is set larger than a total injection amount in the second injection step, and
a number of installments in the first injection step is set larger than a number of installments in the second injection step.

2. The method for manufacturing a film-wrapped electrical device according to claim 1, wherein in the second injection step, the pressure inside the injection chamber is raised stepwise, and the electrolyte solution is injected with the pressure at each level maintained for a certain period of time.

3. A method for manufacturing a film-wrapped electrical device, comprising:
a first injection step of
depressurizing, to a given pressure lower than atmospheric pressure, an inside of an injection chamber in which a bag-shaped laminate film wrapping member is placed, the laminate film wrapping member having an opening portion and housing an electrode assembly including a positive electrode and a negative electrode stacked with a separator therebetween, and
injecting part of a predetermined injection amount of an electrolyte solution into the laminate film wrapping member through the opening portion; and
a second injection step of, after the first injection step, pressurizing the inside of the injection chamber to a pressure higher than the given pressure and lower than an average value of the given pressure and atmospheric pressure, and injecting the rest of the predetermined injection amount of the electrolyte solution into the laminate film wrapping member through the opening portion, wherein
in each of the first injection step and the second injection step, the solution is injected in installments, and
an injection amount in each installment in the second injection step is set larger than an injection amount in the last installment in the first injection step.

* * * * *